United States Patent [19]
Mehnert

[11] 3,884,610
[45] May 20, 1975

[54] BLOW-MOLDING APPARATUS

[76] Inventor: Johannes S. Mehnert, Ernststrasse 11, 5205 St. Augustin-Menden, Germany

[22] Filed: Feb. 20, 1973

[21] Appl. No.: 334,134

[30] Foreign Application Priority Data
Feb. 22, 1972 Germany............................ 2208165

[52] U.S. Cl..................... 425/387 B; 425/DIG. 209
[51] Int. Cl............................................... B29c 5/06
[58] Field of Search ... 425/DIG. 209, 324 B, 387 B, 425/342, 243

[56] References Cited
UNITED STATES PATENTS

| | | |
|---|---|---|
| 2,290,129 | 7/1942 | Moreland et al............ 425/387 B X |
| 2,853,736 | 9/1958 | Gussoni....................... 425/387 B X |
| 3,562,372 | 2/1971 | Schjeldahl et al. ........ 425/DIG. 209 |
| 3,587,133 | 6/1971 | Valyi.............................. 425/387 B |
| 3,609,803 | 10/1971 | Fattori....................... 425/DIG. 209 |
| 3,616,491 | 11/1971 | Vollers...................... 425/DIG. 209 |
| 3,728,063 | 4/1973 | Langecker.................. 425/387 B X |

*Primary Examiner*—Robert L. Spicer, Jr.
*Attorney, Agent, or Firm*—Norman S. Blodgett; Gerry A. Blodgett

[57] ABSTRACT

Blow-molding apparatus for the fabrication of hollow bodies from thermoplastic material, wherein a pre-cast element positioned on a blow pipe receives its finished shape in a hollow mold by blowing compressed air through the pipe.

6 Claims, 7 Drawing Figures

BLOW-MOLDING APPARATUS

BACKGROUND OF THE INVENTION

Fabrication of plastic articles by blow-molding is used for one-time use or disposable packaging material. The complete fabrication procedure is carried out in different, consecutive, continuous steps. In this known procedure, the formation of the blank on the blow pipe and the blowing of the blank itself takes only a relatively short time, but the cooling of the blown-up body within the mold takes considerably longer and absorbs the larger part of the cycle time during the fabrication of the hollow body. The time relationship, within certain limits, depends on the material used, on the shape of the hollow body, and on its wall thickness. With this type of operation procedure, a relatively long cycle time exists before the blow pipe is again free for the next molding operation, because the blow pipe is used without interruption during the entire fabrication procedure.

During the blow-molding of bottles with an inside protecting layer of a different material than that of the rest of the bottle, it is well known to place the protection layer on the blow pipe first inside a so-called "conditioning chamber" in the shape of a pre-cast form which the hollow body is later formed. Thereafter, the blow pipe with the protection layer or pre-cast is brought into an injection molding device, in which the plastic material is placed around the blow pipe, is positioned underneath the mold station, the two halves of the blow mold being arranged concentrically of the conditioning chamber. After the injection procedure, the conditioning chamber and the blow pipe with the two-layer product is displaced upwardly in the axial direction until it is positioned at the same height as the blow mold which has been previously concentric to the conditioning chamber. Thereafter, the blow mold is closed for the blowing operation. With this arrangement and with these operating conditions, the conditioning chamber, the blowing device, the mold, and the injection device are arranged axially in a vertical line. When the hollow body has been blown up, the blow pipe is removed from the blow mold and inserted into the conditioning chamber, where the protection layer is placed onto the blow pipe for the next hollow body. The pressure inside the hollow body is maintained by compressed air which is introduced through a hole at the side into the closed unit formed by the housing and the extrusion injection device. In order not to influence the application of the protection layer to the blow pipe, the conditioning chamber is closed from the compressed air underneath by dampers.

Such an apparatus, however, is only usable for the fabrication of hollow bodies made from two different materials and can do nothing to reduce the cycle time of the fabrication procedure and to increase the molding procedure per blow pipe and time unit. These and other difficulties experienced with the prior art devices have been obviated in a novel manner by the present invention.

It is, therefore, an outstanding object of this invention to supply the blow pipe with more blank casts in a given time than it is possible with the known procedure.

With this and other objects in view, as will be apparent to those skilled in the art, the invention resides in the combination of parts set forth in the specification and covered by the claims appended hereto.

SUMMARY OF THE INVENTION

This invention solves the problem by bringing the blow pipe out of the blow mold into the open before the cooling of the formed hollow body is completed. Immediately after removal of the blow pipe from the blow mold, a compressed air-containing member is brought into the blow mold in place of the blow pipe and is kept there until the cooling procedure has progressed far enough so that the hollow body can be removed from the blow mold.

According to a preferred design of the apparatus, introduction of the pressure medium is made with a member leading compressed air into the blow mold even during the removal of the blow pipe.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
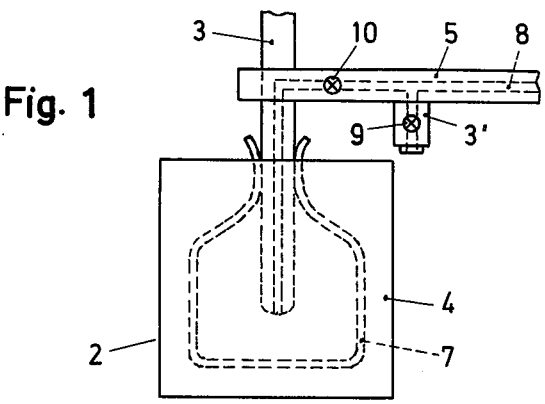
FIG. 1 is a side elevational view of blow-molding apparatus showing it in blowing position.

In a first design of the apparatus with a mold station and a blowing apparatus, the blow pipe and the compressed air-guiding member are arranged on a common guide. In this case, the compressed air-guiding member can be designed at the same time as a gaging part, which is moved into the opening of the blow mold after the removal of the blow pipe.

In a second design of this apparatus with one mold and two blow stations, the blow pipe is arranged on a swingable device and the members guiding the compressed air are designed to be adjustable in the direction of the opening of one blowing device. The compressed air-guiding member can also be designed in the shape of a rod, which is generally the case when an effective purging and with it an effective cooling is to be achieved. In the drawing, the rod-shaped air-pressure guiding members are shown similar to a blow pipe for the sake of simplicity. The rod-shaped compressed air-guiding members are naturally very simple and are not comparable to the complicated design of a blow pipe, which also has to be made very accurately and has to be suitable for the molding procedure and for heat conduction. The invention has the advantage that the blow pipe, during the relatively long cooling period of the hollow body, is removed from the blow mold and is moved to a mold station where another molding may start on the next blank which may be put onto the blow pipe. During this time, the necessary inside pressure is maintained within the blow mold by the compressed air-guiding member without which the cooling procedure cannot proceed because of the memory effect.

Until the hollow body is cooled within the blow mold, the new blank can already be prepared and waiting, so that, after the exit of the cooled-off hollow body, the blow mold is immediately usable. The time saving achieved by this procedure may further be increased because during the cooling procedure the new blank attached to the blow pipe, can be moved into another blow mold, so that with a single blow pipe two or more blow molds may be served during a single cycle in which the blow pipe normally would be blocked by the continuous procedure, especially during the cooling-off period within the blow mold. If one considers that the blow pipe and the pre-mold station for the blanks are generally the most complicated and most expensive tools of a blow-molding apparatus, a lowering of the costs with a considerable increase of capacity can be achieved.

The air-pressure guiding member can be designed in such a way that the compressed air is introduced into the blow mold before the member arrives there, that is, immediately after removal of the blow pipe from the blow mold. By this method it can be assured that, even in cases in which under certain conditions a specially large susceptibility to the appearance of a memory effect is present, it may be prevented. The air-pressure guding member can serve at the same time as a gaging device which shapes the throat part of the hollow body. In other cases, it may be preferable to hold the rod-shaped air-pressure guiding member in a certain position above the opening of the hollow mold from which the blow pipe was removed. By this method the incoming compressed air can be used as a purging medium by which a fast cooling of the hollow body is made possible, especially in the throat part where generally the wall thickness is somewat larger because no appreciable stretching of the material occurs.

FIG. 1 shows a blowing apparatus 2 consisting of the two halves 4 which may be moved apart on a parting line extending in the plane of the drawing. A blow pipe 3 has already expanded the hollow body 7. Through the blow pipe 3 and the guide 5 passes a channel 8 for the compressed air. A compressed air-supplying member 3 blows compressed air into the hollow body 7 after removal of the blow pipe 3 from blow mold 2. The compressed air-supplying member 3' serves at the same time as a gage that is brought into the holllow body 7 for shaping its throat. A valve 9 in the line leading to the compressed air leading member 3' is kept in its closed position and the valve 10 in the line to the blow pipe 3 is kept in its open position when the blow pipe 3 is expanding the hollow body 7. When the air-leading member 3' is supplying compressed air, the valve 10 will be closed and the valve 9 opened. As soon as the blow pipe 3 has been removed from the blow mold 2, the guide 5 is brought to the opening of the blow mold far enough so that the compressed air enters the hollow body 7 from the member 3'. If a gaging of the throat is required, then the compressed air-supplying member 3' is lowered into the throat far enough so that the throat of the hollow body 7 is properly formed. If a gaging is not necessary, the member 3' may be bell-shaped, so that the lower bell rim fits tightly around the opening which is created by the removal of the blow pipe.

Figure 2:
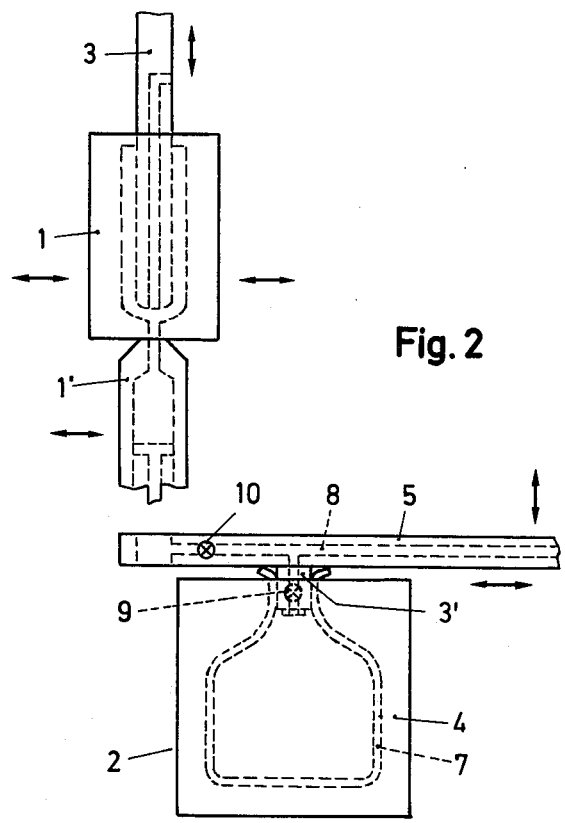
FIG. 2 is a side elevational view with the mold in position.

A pre-shaping of the blank is shown in FIG. 2. The blow pipe 3 is moved from the blow mold 2 into the pre-shape device 1 underneath it. Shown only in part and in simplified form is an injection-molding device 1' which sprays the material into the pre-shape device 1 and the material is formed around the blow pipe 3 for a pre-cast, which will be blown up to the hollow body 7 as described in FIG. 1. In FIG. 2 this pre-shape station as well as the blowing device is formed in two halves which can be moved away from each other. The injection-molding device 1' can be moved laterally underneath the pre-forming station may it be swung underneath.

Figure 3:
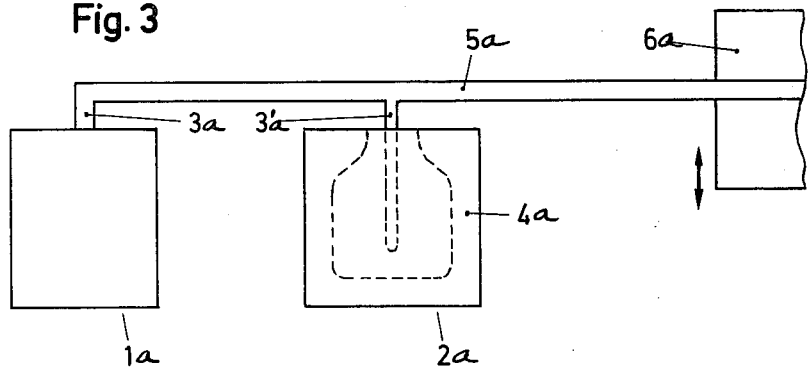
FIGS. 3 to 5 are side views of other designs wherein the three drawings show three different steps of the fabrication procedure.
Figure 4:
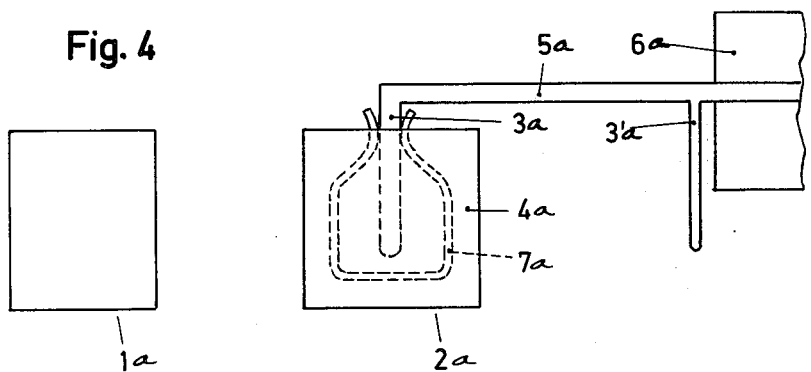
Figure 5:
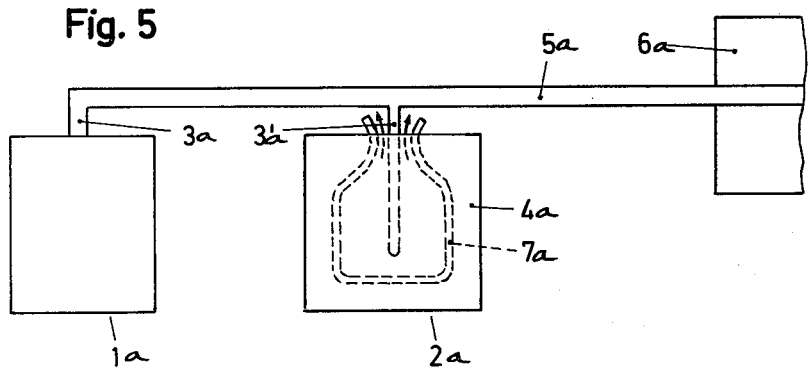

The pre-forming station shown in FIGS. 3 to 5, is designed to use the dip-blow procedure. The blowing device 2a consists of the two halves 4a, which may be moved apart in the drawing plane. The blow pipe 3a dips into the pre-shape station 1a which is designed as a dip station. The compressed air-leading member 3'a is rod-shaped and together with the blow pipe 3a is fastened to a common guide 5a which is displaceable within the housing 6a. The air passages leading to the blow pipe 3a and to the compressed air-supplying member 3'a are not shown here because of their simplicity. They are designed, however, in a manner similar to the design shown in FIGS. 1 and 2 and are also equipped with the previously-described valves 9 and 10.

In FIG. 3 the blow pipe 3a takes on a pre-cast by dipping. Thereafter, the housing 6a is displaced upwardly along the blow pipe axis, so that the blow pipe 3a and with it at the same time the compressed air-supplying member 3'a is pulled out of the dip station 1a. Thereafter, the guide 5a is pulled into the housing 6a so far that the blow pipe 3a may be pushed into the blow device 2a and the housing 6a lowered again. Now the pre-cast is blown up and is positioned at the inside contour of the blow device 2a (see FIG. 4). As soon as the hollow body 7a is sufficiently blown up, the blow pipe 3a and the air-supplying member 3'a take the position shown in FIG. 3, which is also shown in FIG. 5. The blow pipe now takes a new pre-cast and the air-pressure supplying member 3a supplies the hollow body 7a of the previously-described operation cycle with compressed air until the hollow body is cooled off. In place of compressed air, the organ 3'a can be supplied with another gas or pressure media. For example, in this way, a medium can be used which at the same time can fill the hollow body.

Figure 6:
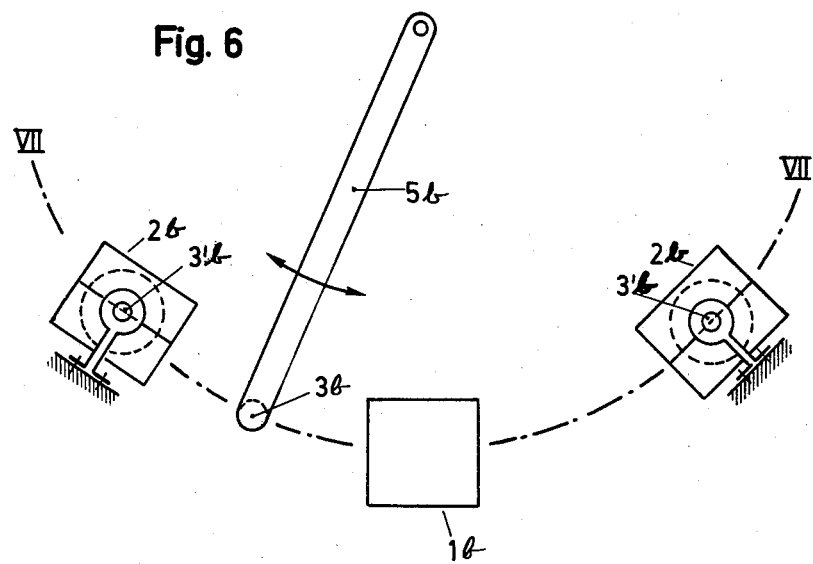
FIG. 6 is a plan view of another design of the apparatus.
Figure 7:
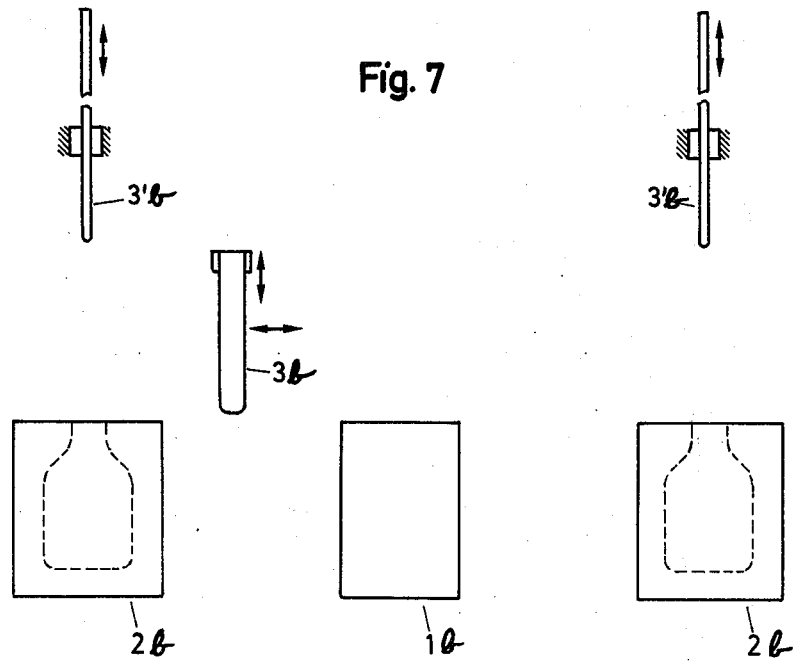
FIG. 7 is a vertical sectional view of the apparatus taken on the line VII—VII of FIG. 6.

FIGS. 6 and 7 show a horizontally swingable and vertically adjustable blow pipe 3b and a vertically adjustable air-pressure supplying member 3'b for each of the two blow devices 2b. The blow pipe 3b can be displaced between the blow devices 2b and the proper air-pressure supplying members 3'b which are arranged additionally above the blow devices 2b and always located at the corresponding height. The operating procedure of this design is as follows: The blow pipe 3b takes on a pre-cast in the pre-shape station 1b and the pre-cast is blown up in the left blow device 2b. After sufficient blowing, it will leave the blow station 2b and the compressed air-supplying member 3b located above the blow mold moves into the blow device and completes the blow-and-cooling process. During this time, the blow pipe 3'b is already taking on a new pre-cast from the pre-shape station 1b, so as to bring it into the right blow device 2b and to blow it up there as far as necessary. Thereafter, the blow pipe 3b moves back to its pre-cast station 1 and the proper compressed air-supplying member 3'b completes the blow-and-cooling process. With this design, therefore, only one precision-fabricated and precision-working blow pipe 3b is required for one pre-shape station 1 and two blow devices 2, since each blow device has its own vertically adjustable, air-pressure supplying member, which completes the blow-and-cooling process during each cycle.

It is obvious that minor changes may be made in the form and construction of the invention without departing from the material spirit thereof. It is not, however, desired to confine the invention to the exact form herein shown and described, but it is described to include all such as properly come within the scope claimed.

The invention having been thus described, what is claimed as new and desired to secure by letters Patent is:

1. Blow-molding apparatus for the fabrication of a hollow body of thermoplastic material within a blow mold, the body being subsequently released from the mold, comprising:
   a. a conventional blow pipe (3) capable of providing a first stream of gas,
   b. a guide (5) for selectively implanting the blow pipe into the mold and extracting the blow pipe from the mold before the body is released from the mold,
   c. a gas-supplying member of simple construction (3') mounted on the guide and separate from the blow pipe, the member being capable of supplying a second stream of gas to the mold after the removal of the blow pipe,
      the guide serving to move the said member into and out of the mold, and
   d. a valve system (9, 10) for selectively directing gas to the blow pipe (3) and the member (3'),
      the blow pipe expanding the body of thermoplastic within the mold and the gas-supplying member maintaining a positive gas pressure within the body while it is allowed to cool.

2. Blow-molding apparatus as recited in claim 1, characterized by the fact that the supplying of compressed gas to the gas-supplying member (3') takes place during a removal of the blow pipe (3) from the blow mold (2).

3. Blow-molding apparatus as recited in claim 1, characterized by the fact that a pre-cast station (1) and the common guide (5) are provided and the pre-cast station (1) and the blow mold (2) are located so that the blow pipe (3) and the compressed gas-supplying member (3') are arranged on the common guide (5) and extend in a single direction from the common guide (5).

4. Blow-molding apparatus as recited in claim 3, characterized by the fact that the blow mold is provided with an opening, the gas-supplying member (3') is shaped to act as a gaging part and, after removal of the blow pipe (3), the member is moved into the opening in the blow mold (2).

5. Blow-molding apparatus as recited in claim 1, characterized by the fact that one pre-shape station (1b) and two blow molds (2) are provided and the blow pipe (3b) is arranged on a swingable device, while a separate gas-supplying member (3'b) is mounted for movement into and out of each of the blow molds (2b).

6. Blow molding apparatus as recited in claim 1, characterized by the fact that the gas-supplying member (3') is rod shaped.

* * * * *